US005563640A

United States Patent [19]
Suzuki

[11] Patent Number: 5,563,640
[45] Date of Patent: Oct. 8, 1996

[54] DROPLET EJECTING DEVICE

[75] Inventor: Masahiko Suzuki, Nagoya, Japan

[73] Assignee: Brother Kogyo Kabushiki Kaisha, Nagoya, Japan

[21] Appl. No.: 209,722

[22] Filed: Mar. 14, 1994

[30] Foreign Application Priority Data

Apr. 16, 1993 [JP] Japan .................................... 5-089673

[51] Int. Cl.$^{6}$ ............................ B41J 2/135; G01D 15/18
[52] U.S. Cl. ............................................................ 347/45
[58] Field of Search ................................................ 347/45

[56] References Cited

U.S. PATENT DOCUMENTS 4,343,013 8/1982 Bader et al. ............................ 347/45
4,890,126 12/1989 Hotomi .................................... 347/45
5,202,702 4/1993 Terasawa et al. .

*Primary Examiner*—Valerie A. Lund
*Attorney, Agent, or Firm*—Oliff & Berridge

[57] ABSTRACT

In droplet ejecting nozzles, a material having a small contact angle with ink is covered over the inner surface of the droplet ejecting nozzles of the nozzle plate. The nozzle plate is made of a material having a contact angle with ink that is larger than the contact angle of the material covering the inner surface of the nozzles. This provides the droplet ejecting nozzles with a stable ink droplet ejecting property.

14 Claims, 4 Drawing Sheets

DROPLET EJECTING DEVICE

BACKGROUND OF THE INVENTION

1. Field of the Invention

The present invention relates to a droplet ejecting device and, more particularly, to a droplet ejecting nozzle.

2. Description of Related Art

Conventionally, various droplet ejecting devices such as ink jet printers form desired characters and figures on a printing sheet according to a predetermined signal. An ink droplet ejecting nozzle portion for ejecting ink droplets is the most important part of such droplet ejecting devices with respect to the printing quality of characters and figures formed on the printing sheet.

Water base dye ink, water base pigment ink, solvent pigment ink or hot melt ink can be used as ink for the above-described ink droplet ejecting devices. The ink droplet ejecting nozzles are necessarily designed in accordance with materials and shapes that are appropriate to the properties of ink to be used. These properties include surface tension and viscosity. It is especially important to control the wettability of the ink droplet ejecting nozzle portion for various inks. The wettability is determined by the physical property values such as the surface tension of the ink and the physical property values such as the surface tension of the material of the ink droplet ejecting nozzles.

Conventionally, nozzle plates have been made as follows to control wettability. The plate is typically made of a material whose wettability to the ink to be used is good (i.e. a small contact angle). A liquid-repellent process is made on the surface of the plate to form a liquid-repellent layer, and the desired number of ink droplet ejecting nozzles are formed in the plate. The nozzle plate made by the above-method has a different wettability to ink between the surface of the nozzle plate and the inner surface of ink droplet ejecting nozzles. Therefore, the nozzle plate meets wettability conditions such as smooth flow of ink in the nozzle holes and an ink-repellent property of the surface of the nozzle plate, which increases the printing quality and provides stable ink droplet ejecting.

However, when the desired number of ink droplet ejecting nozzles are formed in the nozzle plate having a liquid-repellent layer by the methods such as exima laser processing, microdrill processing, electric discharge machining and etching processing, the processing of the plate and the liquid-repellent layer is significantly different since each physical property of the nozzle plate material and the liquid-repellent layer differ. That is, in the ink droplet ejecting nozzle portion made by the above-mentioned method, burrs are easily made on the edge of the nozzle, and the liquid-repellent layer formed on the surface of the nozzle plate is easily damaged. Therefore, the printing quality deteriorates, and the stable ink droplet ejecting diminishes over time since the droplets are not ejected to a proper place.

Another method for making a nozzle plate is described as follows. After the desired number of nozzle holes are formed in the nozzle plate, the liquid-repellent processing is made on the surface of the nozzle plate to form the liquid-repellent layer. However, it is extremely difficult to prevent the adherence of the liquid-repellent material to the inner surface of the ink droplet ejecting nozzle regardless of a wet or dry liquid-repellent processing method. In some cases, the liquid-repellent material clogs the ink droplet ejecting nozzle holes.

Moreover, if a cleaning operation is executed, such as disclosed in U.S. Pat. No. 5,202,702, the liquid-repellent layer of the nozzle plate peels off by the sliding operation of the cleaning member with the surface of the nozzle plate. As a result, there arises a problem that ink spreads around the nozzle holes and is not ejected properly. Especially when pigment ink is used, the liquid-repellent layer is worn off due to the physical contact of the cleaning member and the nozzle plate and the abrasion phenomenon of the pigment, which is a solid included in the pigment ink. As a result, the liquid-repellent layer of the nozzle plate easily flakes off.

SUMMARY OF THE INVENTION

An object of the present invention is to provide a droplet ejecting device having ink droplet ejecting nozzles capable of increasing printing quality and ejecting droplets stably.

To achieve the above and other objects, an ink droplet ejecting device comprises a plate and droplet ejecting nozzles formed in the plate through which ink droplets are ejected. A contact angle of an inner surface of the droplet ejecting nozzles with the ink droplets is smaller than a contact angle of the plate with the ink droplets.

In the ink droplet ejecting device as constructed above, the plate is made of a material whose contact angle with the ink droplets is not less than a contact angle of the inner surface of the ink droplet ejecting nozzles with the ink droplets. The inner surface of the droplet ejecting nozzles operates as a smooth liquid passage of ink when the ink droplets are ejected and as a critical surface for holding a stable ink meniscus in the droplet ejecting nozzles.

As is clear from the above-explanation, in the ink droplet ejecting device of the present invention, the nozzle forming portion has a good ink-repellent property and an inner surface of the nozzles has good wettability. Therefore, a wiping operation can be made effectively, and ink droplets will be ejected properly and stably.

BRIEF DESCRIPTION OF THE DRAWINGS

Preferred embodiments of the present invention will be described in detail with reference to the following figures wherein.

DETAILED DESCRIPTION OF PREFERRED EMBODIMENTS

Figure 1:
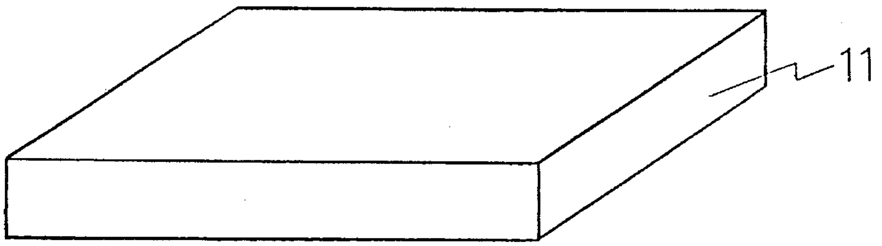
FIG. 1 is a perspective view of a sheet for the nozzle plate of the first, second, and fourth embodiments.

Hereafter, the preferred embodiments that represent the present invention are explained by referring to the drawings.

Figure 2:
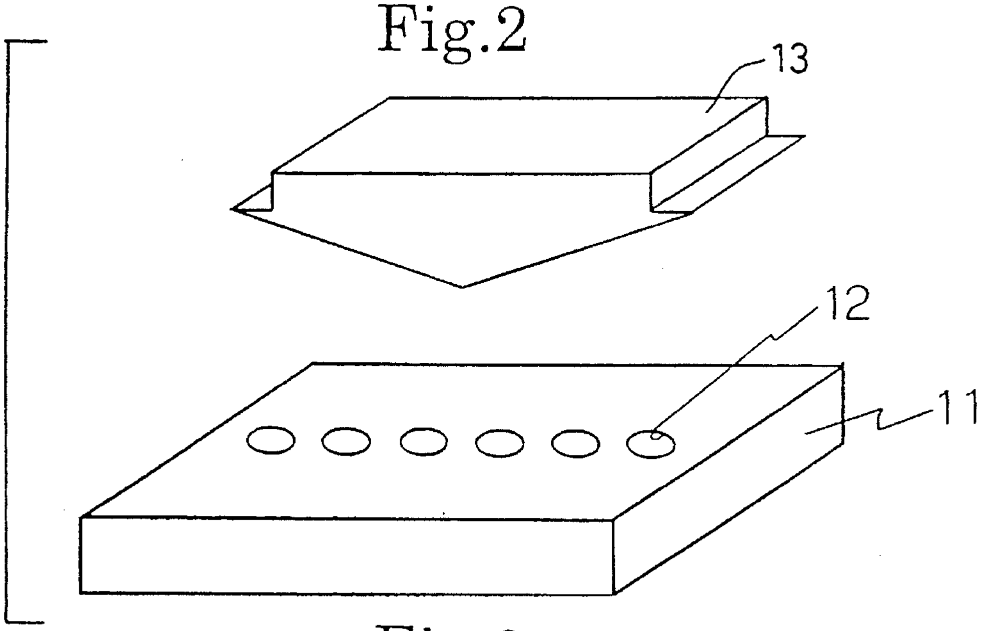
FIG. 2 is a perspective view of the nozzle plate of the first, second and fourth embodiments after the nozzle holes are processed.
Figure 3:
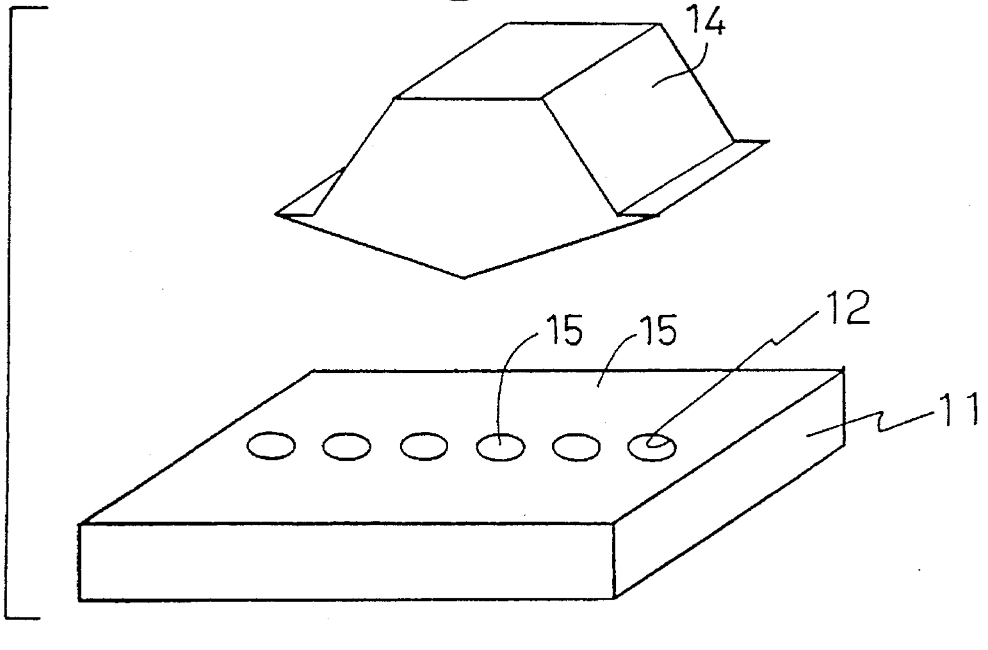
FIG. 3 is a perspective view of the nozzle plate of the first, second and fourth embodiments after the coating operation.

The manufacturing method of the ink droplet ejecting nozzle plate of the first embodiment is explained by referring to FIGS. 1–3. FIG. 1 shows a sheet 11 for the nozzle plate. In the first embodiment, water base dye ink, which includes water as a solvent and glycerin as a wetting agent for a dry-proof property, is used as a liquid to be ejected. Therefore, various organic materials such as polysulfone (PSF), polyethersulfone (PES), and polyimide (PI) can be used as materials for the nozzle plate. These materials have comparatively bad wettability (large contact angle) to the water base dye ink. The contact angle of these materials with the water base dye ink ranges 70°–80° as determined by experimentation.

In the first embodiment, a polyimide sheet of about 0.1 mm thickness is used as the sheet 11 for the nozzle plate. The desired number of ink droplet ejecting nozzles 12 having a diameter of about 40 μm are formed in the sheet 11 for the nozzle plate by the imaging mask method with an exima laser 13 as shown FIG. 2. Next, as shown in FIG. 3, an oxidation silicon (SiOx) film 15 is coated by using a magnetron sputtering method 14 over an inner surface of the ink droplet ejecting nozzles 12 formed with exima laser 13 and one surface of the sheet 11 for the nozzle plate. The contact angle of the oxidation silicon (SiOx) film 15 formed by the magnetron sputtering method 14 with the water base dye ink ranges 10°–20° as determined by experimentation.

Figure 4:
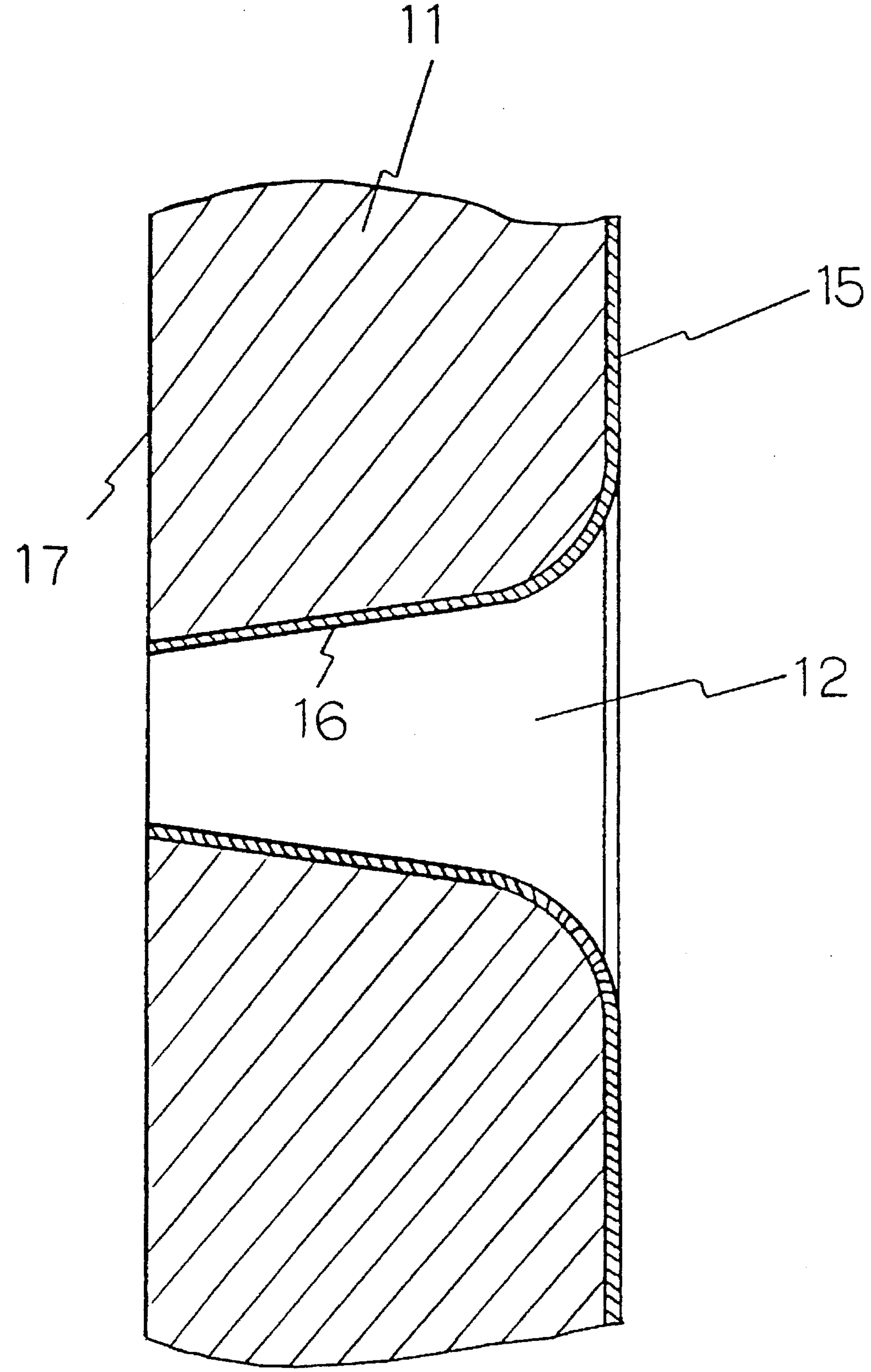
FIG. 4 is an enlarged partial sectional view of the nozzle holes of the first, second and fourth embodiments.

FIG. 4 shows a cross-sectional view of the ink droplet ejecting nozzle portion of the first embodiment. The surface 17 of the ink droplet ejecting nozzle plate 11 comprises a material having poor wettability whose contact angle with the water base dye ink ranges 70°–80°. Therefore, ink droplets that adhere to the nozzle plate accidentally when ink droplets are ejected are removed easily by a wiping member to store the surface condition of the nozzle plate to an initial condition. Moreover, the abrasion phenomenon is not observed, and the initial condition is maintained on the surface 17 of the ink droplet ejecting nozzle plate, even though the mechanical contact of the wiping member and the cleaning member is repeated. The inner surface 16 of the ink droplet ejecting nozzles 12 is coated with the oxidation silicon (SiOx) film 15 having a good wettability to the water base dye ink. Therefore, since the inner surface 16 conforms with the ink, the shape of ink meniscus at the top surface of ink filled in the ink ejecting nozzles 12 can be kept stable for a long time, both when ink is ejected and when ink is not ejected.

Next, the second embodiment of the present invention is explained. A water base pigment ink, which includes water as a solvent and glycerin as a wetting agent for dry-proof property and carbon black as a black pigment, is used as a liquid to be ejected in this embodiment. Various organic materials such as polysulfone (PSF), polyethersulfone (PES), and polyimide (PI) can be used as a material for the nozzle plate having poor wettability (i.e. a large contact angle) to the water base pigment ink. The contact angle of these materials to the water base pigment ink ranges 60°–70° as determined by experimentation.

In the second embodiment, the nozzle plate is made of polysulfone, and the desired number of ink droplet ejecting nozzles 12 having a diameter of about 40 μm are formed in the nozzle plate by molding. Next, an oxidation silicon (SiOx) film 15 is coated over the inner side of the ink droplet ejecting nozzles made by molding and over one surface of the nozzle plate by the magnetron sputtering method 14, as shown in FIG. 3. The contact angle of the oxidation silicon (SiOx) film 15 formed by the magnetron sputtering method 14 of the embodiment with the water base pigment ink ranges 5°–15°.

The cross-sectional view of the ink droplet ejecting nozzle portion of the second embodiment is shown in FIG. 4. The contact angle of the surface 17 of the ink droplet ejecting nozzle plate with water base pigment ink is large and ranges 60°–70° and the surface of the nozzle plate has poor wettability. Therefore, since ink droplets that adhere to the nozzle plate accidentally when ink droplets are ejected are easily removed by the wiping member, the condition of the nozzle surface can be restored to an initial condition. Moreover, the surface 17 of the ink droplet nozzle plate is worn off by the mechanical contact with the wiping member or the cleaning member and the abrasion phenomenon from the pigment, which is included in the water base pigment ink as a solid. However, even if the surface 17 of the nozzle plate 11 is worn off due to the abrasion phenomenon, the worn surface also comprises polysulfone. Therefore, the wettability of the surface 17 to the ink does not change, and the surface 17 maintains its initial condition.

The inner surface 16 of the ink droplet ejecting nozzles 12 is coated with the oxidation silicon (SiOx) film 15 having a good wettability to water base pigment ink. Since the inner surface of the nozzles 12 conforms with the ink, the shape of ink meniscus at the top surface of the ink filled in the ink ejecting nozzles 12 is stable both when the ink droplets are ejected and when the ink droplets are not ejected. Thus, ink droplets are ejected stably for a long time.

Figure 5:
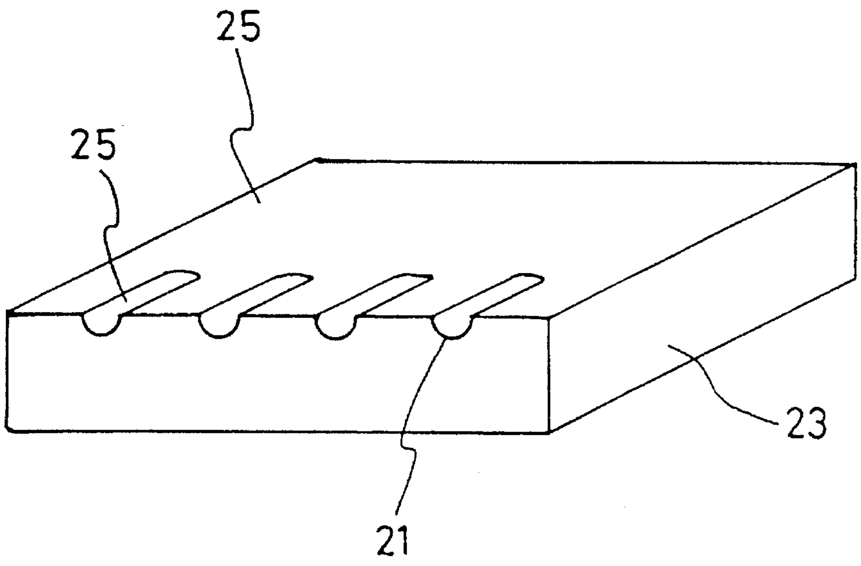
FIG. 5 is a perspective view of the cover plate of the third embodiment.
Figure 6:
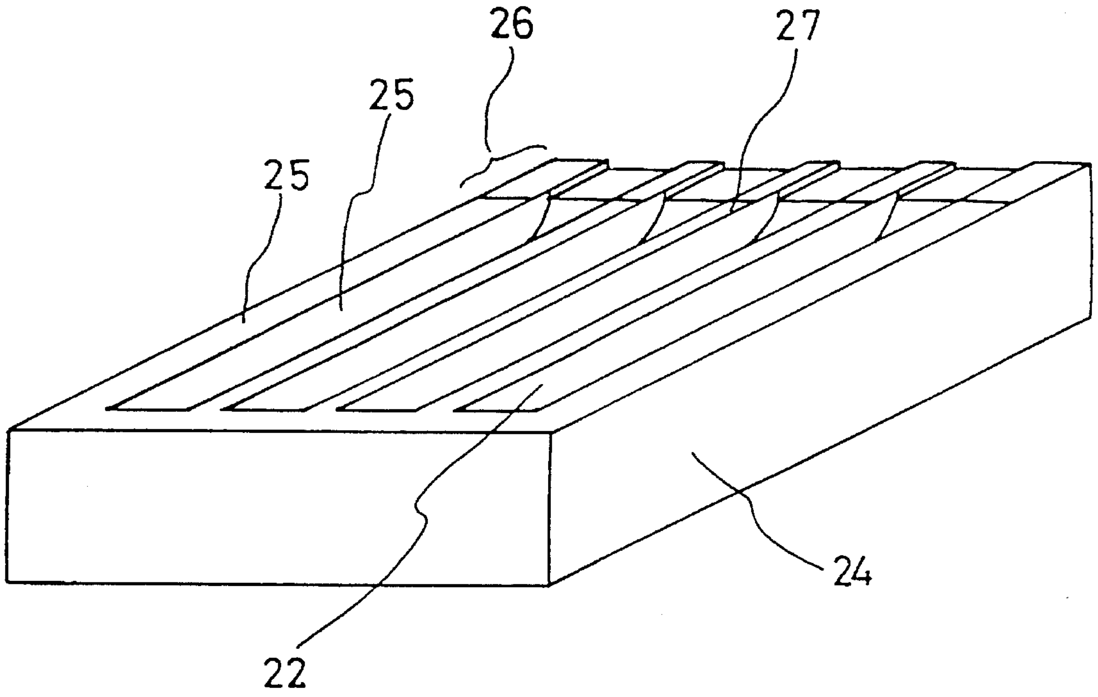
FIG. 6 is a perspective view of the actuator of the third embodiment.

Next, the third embodiment of the present invention is explained. FIGS. 5 and 6 show perspective views of main parts of the droplet ejecting device of the third embodiment. FIG. 5 shows a cover plate 23 comprising non-polarized zirconate-titanate lead piezoelectric material. The desired number of grooves 21 for the nozzles are formed on the cover plate 23 and are equally spaced using a diamond cutting blade in a dicing machine, as shown in FIG. 5. A coating film 25 of oxidation silicon (SiOx) is formed on the inner surface of grooves 21 for the nozzles and the upper surface of the cover plate 23 by the magnetron sputtering method.

FIG. 6 shows an actuator 24 made from a polarized zirconate-titanate lead piezoelectric material. As shown in FIG. 6, grooves 22 that operate as a pressure chamber and a passage for ink are formed in the actuator 24 corresponding to the grooves 21 for nozzles using a diamond cutting blade of a dicing machine. That is, the same number of grooves 22 and grooves 21 are formed having the same spacing 21. The width of each groove 22 is larger than the width of each groove 21 for the nozzles. A coating film 25 of oxidation silicon (SiOx) is formed on the inner surface of the grooves 22 and the upper surface of the actuator 24 beside the electrical connecting parts 26 by the magnetron sputtering method.

In the droplet ejecting device of the third embodiment, the cover plate 23 and the actuator 24 are bonded by epoxy adhesive so that each of the grooves 21 and 22 confront each other. Control electrodes (not shown) are provided on both surfaces of walls 27 of the piezoelectric material comprising the actuator. Control electrodes energize the driving magnetic field, which is perpendicular to the polarized direction of the piezoelectric material. Thus, a shear deformation arises in the walls 27 of the piezoelectric material, and the capacity of the grooves 22, which operate as a piezoelectric chamber and a passage, changes, and the pressure in the grooves 22 are changed. Thus, ink droplets are ejected from the ink ejecting nozzles.

Figure 7A:
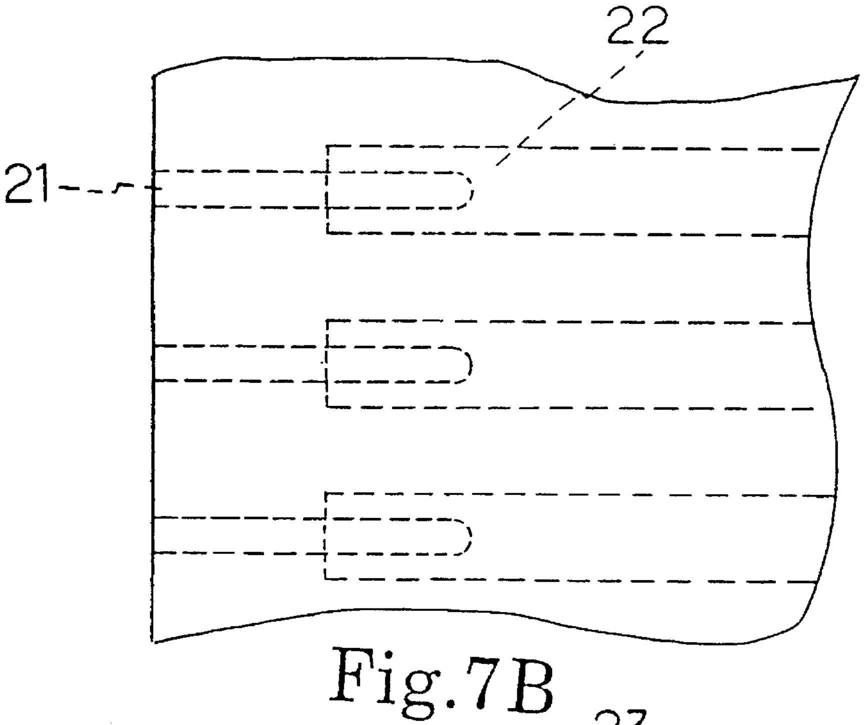
FIG. 7A is a partial exploded plan view of the nozzle holes of the third embodiment.
Figure 7B:
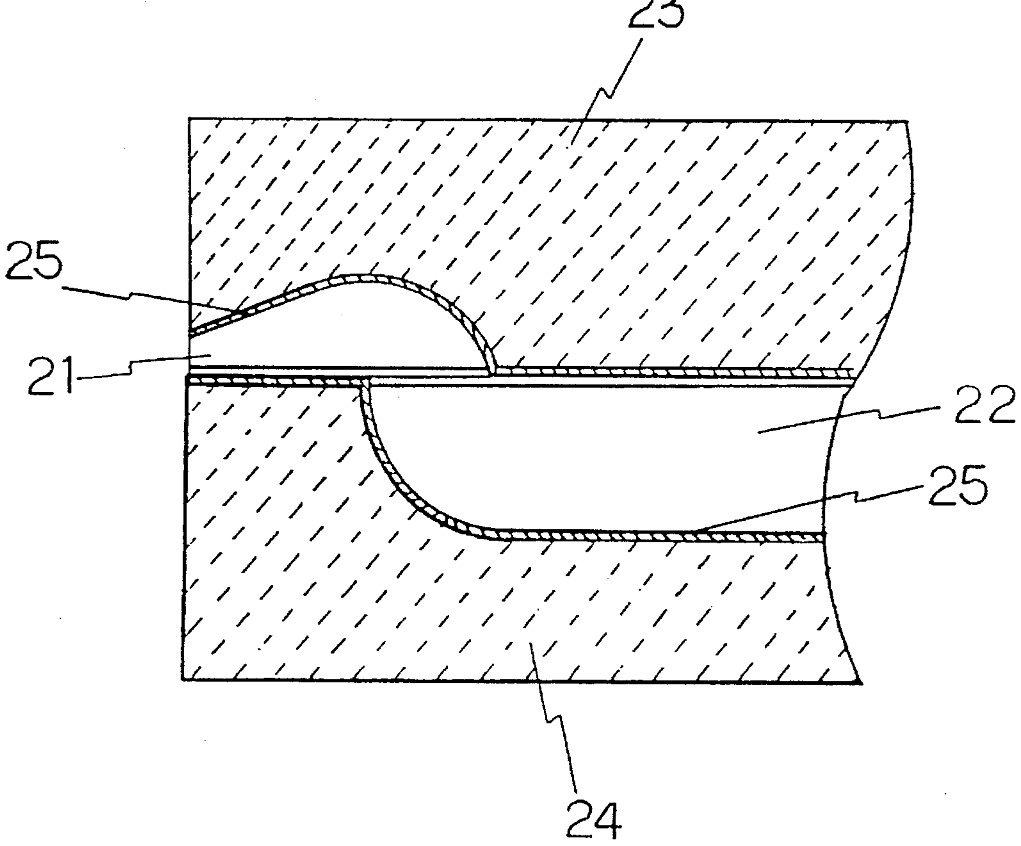
FIG. 7B is an enlarged sectional plan view of the nozzle holes of the third embodiment.

FIGS. 7A and 7B show the ink droplet ejecting nozzles of the droplet ejecting device where the cover plate 23 and the actuator are bonded with each other. The grooves 21 for the nozzles of the cover plate 23 form the ink droplet ejecting nozzles by bonding with the actuator 24. In the third embodiment, water base pigment ink includes water as a solvent, glycerin as a wetting agent for a dry-proof property and carbon black as a black pigment. The ejecting nozzle side surface of the cover plate 23 and the actuator 24, which are bonded with each other, are processed by a wrapping processing and a mirror like finishing processing after a cutting processing. The contact angle of the piezoelectric material of zirconate-titanate lead processed by the mirror like finishing processing with the water base pigment ink ranges 80°–85°, which is quite a high value. The contact angle of the oxidation silicon (SiOx) film 25 formed on the surface of the piezoelectric material of zirconate-titanate lead by the magnetron sputtering method with the water base pigment ink ranges 5°–15° as determined by experimentation.

Therefore, since ink droplets that adhere to the nozzle surface of the ejecting device accidentally are removed easily by the wiping member, the condition of the nozzle surface of the ejecting device can be recovered to an initial condition. In this embodiment, the nozzle surface of the droplet ejecting device may be worn off due to the mechanical contact with the wiping member or the cleaning member and the abrasion phenomenon of pigment, which is a solid included in the water base pigment ink. However, the nozzle surface is hardly worn off because the nozzle surface of the above-embodiment comprises the zirconate-titanate lead piezoelectric material, which has a greater hardness than the carbon black used as a pigment. Even if minute wear occurs, the wettability of the nozzle surface to the ink is not changed at all, and the initial condition of the nozzle surface is maintained because the newly exposed nozzle surface also comprises the zirconate-titanate lead piezoelectric material. The inner surface of the ink droplet ejecting nozzles are coated by the oxidation silicon (SiOx) film 25 having good wettability to the water base pigment ink. Therefore, the inner surface of the nozzles conforms with the ink, and the condition of the ink meniscus formed at the top surface of the ink filled in the ink droplet ejecting nozzles is stable, both when the ink droplets are ejected and when the droplets are not ejected. Thus, the ink droplets are ejected stably for a long time.

Next, the fourth embodiment is explained. A solvent pigment ink, including tripropyleneglycol monomethylether (TPM) as a solvent and carbon black as a black pigment, is used in the fourth embodiment. Fluorine resin can be used as a material that has poor wettability (i.e. a large contact angle) to the solvent pigment ink. The contact angle of the material with the solvent pigment ink ranges 50°–60° as a result of a measurement experiment. In this embodiment, the desired number of ink droplet ejecting nozzles 12 having a diameter of about 40 μm are formed in the nozzle plate comprising the fluorine resin by the microdrill processing, as shown in FIG. 2.

Next, the oxidation silicon (SiOx) film 15 is coated over the inner surface of the ink droplet ejecting nozzles 12, which is formed by the microdrill processing method, and one surface of the nozzle plate by the magnetron sputtering method 14, as shown in FIG. 3. The contact angle of the oxidation silicon (SiOx) film 15 formed by the magnetron sputtering method 14 with the solvent pigment ink ranges 2°–5° as determined by experimentation.

The cross-sectional view of the ink drop jet nozzle portion of this embodiment is shown in FIG. 4. The surface 17 of the ink droplet ejecting nozzle plate comprises a material whose contact angle with the solvent pigment ink ranges 50°–60° and has a bad wettability to the solvent pigment ink. Therefore, the ink droplets that adhere accidentally to the surface of the nozzle plate are removed easily by the wiping member and the condition of the surface of the nozzle plate is recovered to an initial condition. The surface 17 of the ink droplet ejecting nozzle plate are worn off due to the mechanical contact with the wiping member or the cleaning member and the abrasion phenomenon of the pigment included in the solvent pigment ink as a liquid. However, the wettability to the ink is not changed, and the initial condition of the nozzle surface is maintained since the newly exposed material also comprises fluorine resin used for the nozzle plate 11 even if the surface of the nozzle plate 11 is worn off.

The inner surface 16 of nozzles 12 is coated with the oxidation silicon (SiOx) film 15 having a good wettability to the water pigment ink. Therefore, since the inner surface of the nozzles conforms with the ink, the shape of ink meniscus formed at the top surface of the ink filled in the ink droplet ejecting nozzles 12 are stable both when ink droplets are ejected and when the ink droplets are not ejected. Thus, the ink droplets are ejected stably for a long time.

In the above embodiments, the contact angle of the material of the nozzle forming portion with water base pigment ink ranges 60°–85°, the contact angle of the material of the nozzle forming portion with ink in general ranges 50°–85°, and the contact angle of the oxidation silicon film ranges 2°–20°.

The ink droplets ejecting portion of the above-embodiments are formed with a first step for forming the desired number of ink droplet ejecting nozzles in the plate having a bad wettability (i.e. a large contact angle) to ink and a second step for coating the material having a good wettability (i.e. a small contact angle) to ink over the inner surface of the ink droplet ejecting nozzles.

In the conventional method, the desired number of ink droplet ejecting nozzles are formed in the nozzle plate having a liquid-repellent layer thereon by exima laser processing, microdrill processing, electric discharging processing and etching processing. In the nozzle plate formed in this conventional method, burrs arise at the nozzle edges since the physical property of the liquid-repellent layer and that of the nozzle plate are different and the liquid-repellent layer of the nozzle plate surface is damaged. However, in the above-embodiments, these problems do not arise. Therefore, the conditions for high printing quality and stable ink droplet ejecting are satisfied.

Moreover, in the conventional method, when a liquid-repellent processing is made on the nozzle plate surface after a desired number of ink droplet ejecting nozzles are formed in the nozzle plate, the liquid-repellent processing is made on the inner surface of ink droplet ejecting nozzles or the ink droplet ejecting nozzles are clogged with the liquid-repellent material. However, in the above-embodiments, these problems do not arise.

In the above-embodiments, the oxidation silicon (SiOx) film 15 having a good wettability (i.e. a small contact angle) is coated over all of the inner surface of the ink droplet ejecting nozzles 12 formed by a material having poor wettability (i.e. a large contact angle). However, the oxidation silicon (SiOx) film 15 can be coated over the inner surface of the ink droplet ejecting nozzles 12 excluding a portion around the openings on the ejecting side. In this case, ink is not easily dried because the ink meniscus is formed inside the ink droplet ejecting nozzles 12. Moreover, ink droplets are ejected straight toward a printing sheet since the ink droplets are guided by the ink droplet nozzles 12.

Further, in the above embodiments the oxidation silicon (SiOx) film is used as a coating film. However, titanium oxide (TiOx) film can be used instead. In this case, the contact angle of the titanium oxide film with a water base dye ink ranges 15°–25°, that with a water base pigment ink ranges 9°–15° and that with solvent ink ranges 9°–20°. Moreover, the contact angle of the titanium oxide film with all of the types of ink ranges 9°–25°.

While advantageous embodiments have been chosen to illustrate the invention, it will be understood by those skilled in the art that various changes and modifications can be made therein without departing from the scope of the invention as defined in the appended claims.

What is claimed is:

1. An ink droplet ejecting device comprising:

a plate with droplet ejecting nozzles formed therein through which ink droplets are ejected, said plate having an outer surface and said nozzles having an inner surface, wherein said plate comprises a material having a poor wettability; and a film coated on said inner surface of said nozzles directly adjacent to said outer surface of said plate, said film comprising a material having a good wettability, wherein a contact angle of said film on said inner surface of said nozzles with the ink droplets is smaller than a contact angle of said outer surface of said plate with the ink droplets.

2. The ink droplet ejecting device as claimed in claim 1, wherein said plate comprises a material selected from the group consisting of polysulfone, polyethersulfone, polyimide, fluorine resin and zirconate-titanate lead piezoelectric material.

3. The ink droplet ejecting device as claimed in claim 1, wherein said film is selected from the group consisting of silicon oxides and titanium oxide.

4. The ink droplet ejecting device as claimed in claim 1, wherein a material having the smaller contact angle with the ink droplets than said plate is coated over said inner surface of said nozzles and a back surface of said plate.

5. The ink droplet ejecting device as claimed in claim 1, wherein said plate has a contact angle with the ink droplets of 50° or greater.

6. The ink droplet ejecting device as claimed in claim 1, wherein said plate has a contact angle with the ink droplets in a range of 50° to 85°.

7. The ink droplet ejecting device as claimed in claim 1, wherein said inner surface of said nozzles has a contact angle with the ink droplets of 25° or less.

8. The ink droplet ejecting device as claimed in claim 1, wherein said inner surface of said nozzles has a contact angle with the ink droplets in a range of 2° to 25°.

9. The ink droplet ejecting device as claimed in claim 1, wherein said film is coated entirely over said inner surface of said nozzles.

10. A nozzle assembly for an ink droplet ejecting device comprising:

a plate having nozzles formed therein for ejecting ink droplets, said plate having a first contact angle with the ink droplets, and said nozzles having an inner surface with a second contact angle with the ink droplets, wherein said inner surface of said nozzles is entirely coated with a material having a high wettability and said plate is made of a material having a low wettability, wherein said first contact angle is greater than said second contact angle.

11. The nozzle assembly as claimed in claim 10, wherein said plate comprises a material selected from the group consisting of polysulfone, polyethersulfone, polyimide, fluorine resin and zirconate-titanate lead piezoelectric material.

12. The nozzle assembly as claimed in claim 10, wherein said material coated on said inner surface of said nozzles is selected from the group consisting of silicon oxides and titanium oxide.

13. The nozzle assembly as claimed in claim 10, wherein said material coated on said inner surface of said nozzles is also coated on a back surface of said plate.

14. The nozzle assembly as claimed in claim 10, wherein said plate has a contact angle with the ink droplets of 50° or greater and said inner surface of said nozzles has a contact angle with the ink droplets of 25° or less.

* * * * *